UNITED STATES PATENT OFFICE 2,598,372

PRODUCTION OF POLYMERIC COMPOUNDS FROM ANHYDROCARBOXY - ALPHA-AMINO-CARBOXYLIC ACIDS IN NITROBENZENE

William Edward Hanby, Stephen Gerald Waley, and James Watson, Maidenhead, England, assignors to Courtaulds Limited, London, England, a British company No Drawing. Application May 1, 1950, Serial No. 159,392. In Great Britain May 20, 1949

3 Claims. (Cl. 260—77.5)

This invention relates to the production of polymeric compounds and particularly to the production of synthetic polypeptides by polymerising anhydrocarboxyamino-acids having the general formula:

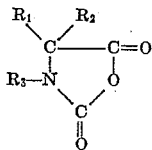

$R_1$, $R_2$ and $R_3$ being hydrogen atoms or alkyl, aryl or aralkyl groups, which may be substituted or unsubstituted.

H. Leuchs has already reported, in Berichte, vol. 41 (1908) page 1721, that glycine carbonic anhydride (in which $R_1$, $R_2$ and $R_3$ in the above formula are all H) can be polymerised by treatment with a small proportion of water either at room temperature or by heating, the polymerisation being accompanied by evolution of carbon dioxide. T. Curtius and W. Sieber, in Berichte, volume 55 (1922) page 1543, reported that other anhydrocarboxyamino-acids could be used, further specified examples being anhydrocarboxy-DL-α-amino-n-butyric acid and anhydrocarboxy-DL-phenylalanine. Wessely, in the Zeitschrift für Physiologische Chemie, volume 146 (1925) page 172, reported that a base such as pyridine may also be used as an initiator for the polymerisation. R. B. Woodward and C. H. Schramm, in the Journal of the American Chemical Society, volume 69 (1947) pages 1551–2, reported that synthetic polypeptides and copolymeric peptides may be obtained from one or more anhydrocarboxyamino-acids having the general formula:

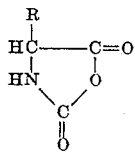

using as an initiator water or any substance XH in which H is an active hydrogen atom; a copolymeric peptide from anhydrocarboxy-L-leucine and anhydrocarboxy - DL - phenylalanine using water as an initiator, is specifically described. W. T. Astbury, C. E. Dalgliesh, S. F. Darmon and G. B. B. M. Sutherland, following on the work of Woodward and Schramm, reported in Nature, volume 162 (1948), No. 4120, pages 596–9 that they had prepared polypeptides from single amino-acids and copolymers of two or more amino-acids using a tertiary base as initiator; amino-acids specified are glycine, sarcosine, DL-alanine, L-alanine, L-valine, DL-leucine, D-leucine, L-leucine, DL-isoleucine, D-isoleucine, L-isoleucine, DL-norleucine, DL-α-phenylglycine, DL-phenylalanine, L-phenylalanine and L-tyrosine.

The object of the present invention is to produce fibre-forming synthetic polypeptides from anhydrocarboxyamino-acids.

According to the present invention, fibre-forming polypeptides are produced by polymerising one or more anhydrocarboxyamino-acids in the presence of an initiator having an active hydrogen atom, the proportion of the initiator used being such that the molecular ratio of initiator to total anhydrocarboxyamino-acid is 1:at least 350, and preferably 1:at least 400.

Copolymeric peptides may also be produced according to the invention, for example by polymerising mixtures of anhydrocarboxyamino-acids in the presence of an initiator, or by first polymerising one anhydrocarboxyamino - acid alone in the presence of an initiator, and then adding a second anhydrocarboxyamino-acid and continuing the polymerisation to give a copolymeric peptide.

Investigations which we have carried out on the production of polypeptides by the polymerisation of anhydrocarboxyamino-acids have shown that the proportion of initiator used is one of the important factors determining whether the polypeptide obtained will be fibre-forming or non-fibre-forming. We have found that when using a molecular ratio of an initiator as defined to anhydrocarboxyamino-acid of at least 1:350, the product is fibre-forming. The molecular weight of the polymeric or copolymeric products may be controlled by suitably adjusting the molecular proportion of initiator to anhydrocarboxyamino-acid.

Suitable initiators for use in the present invention are water, primary amines, secondary amines and phenols; specific examples are N-(aminoacetyl) - dimethylamine, N-(α-amino-β-phenylpropionyl)-dimethylamine, sarcosine dimethylamide and phenol. Pyridine, and like tertiary amines which have previously been proposed as catalysts, have no active hydrogen atom and, while they initiate the reaction sufficiently to form polymers, such polymers are not fibre-forming.

Suitable anhydrocarboxyamino-acids for use in the present invention are anhydrocarboxy- DL-β-phenylalanine, the gamma-methyl ester of anhydrocarboxy-L-glutamic acid

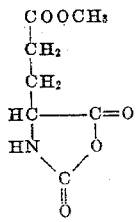

the gamma-benzyl ester of anhydrocarboxy-L-glutamic acid, the gamma-benzyl ester of anhydrocarboxy-DL-glutamic acid, anhydrocarboxy-DL-leucine, anhydrocarboxy-DL-norleucine, anhydrocarboxy-DL-isoleucine, the gamma-methyl ester of anhydrocarboxy-DL-glutamic acid, anhydrocarboxy-DL-valine, anhydrocarboxy-DL-norvaline, anhydrocarboxy-glycine, and anhydrocarboxy-α-aminoisobutyric acid. Copolymers of any of these anhydrocarboxyamino-acids may also be prepared. In making copolymers, it is preferred to use substantially equimolecular proportions of the anhydrocarboxyamino-acids but this is not essential as other proportions will yield fibre-forming copolymers provided that the proportion of the initiator used is that specified according to the invention.

The polymerisation is preferably effected in the presence of a solvent which is a solvent for the anhydrocarboxyamino-acid and for the polypeptide. The solvent should be inert to the reactants, that is to say it should be free from active hydrogen atoms which serve to initiate polymerisation. Nitrobenzene is an example of a suitable solvent.

The polymerisation may be effected by allowing the mixture of anhydrocarboxyamino-acid and initiator to stand either at ordinary temperatures (approximately 20° centigrade) or at raised temperatures, for example 50° centigrade. As the polymerisation is accompanied by evolution of carbon dioxide the course of the polymerisation may be determined by observing the rate at which gas is evolved.

The invention is illustrated by the following examples:

*Example 1*

1/100 mol of anhydrocarboxy-DL-β-phenylalanine and 1/100 mol of the gamma-methyl ester of anhydrocarboxy-L-glutamic acid were dissolved in purified nitrobenzene containing 1/20,000 mol of N-(amino-acetyl)-dimethylamine (NH₂—CH₂—CO—N(CH₃)₂)

After standing 15 days at 50° centigrade the resultant gel was triturated with petroleum ether and the solid precipitate was filtered off, washed thoroughly with petroleum ether to remove nitrobenzene and dried in air. The product was a fibre-forming copolymer of DL-β-phenylalanine and gamma-methyl-L-glutamate.

*Example 2*

1/50 mol of anhydrocarboxy-DL-β-phenylalanine was added to purified nitrobenzene (10 cubic centimeters) containing 1/20,000 mol of N-(α-amino-β-phenyl-propionyl)-dimethylamine. After 3 days at 50° centigrade the polymer was precipitated with petrol, washed with petrol and dried. The product was a fibre-forming polymeric DL-β-phenylalanine.

*Example 3*

60 millimols of anhydrocarboxy-DL-leucine and 60 millimols of anhydrocarboxy-DL-β-phenylalanine were dissolved in approximately three times their total weight of nitrobenzene. 0.15 millimol of sarcosine dimethylamide in benzene solution was added as initiator and the mixture was allowed to stand for 3 days at 50° centigrade. At the end of this time polymerisation was substantially completed and evolution of carbon dioxide had substantially ceased. The polymer was precipitated by adding petroleum ether, the precipitate was filtered off, washed with petroleum ether and dried. The product was a fibre-forming copolymer of DL-leucine and DL-β-phenylalanine.

*Example 4*

60 millimols of the gamma-methyl ester of anhydrocarboxy-L-glutamic acid and 60 millimols of anhydrocarboxy glycine were dissolved in approximately three times their total weight of nitrobenzene. 0.15 millimol of sarcosine dimethylamide in benzene solution was added as initiator and the mixture was allowed to stand for 3 days at 50° centigrade. At the end of this time polymerisation was substantially completed and evolution of carbon dioxide had substantially ceased. The polymer was precipitated by adding petroleum ether, the precipitate was filtered off, washed with petroleum ether and dried. The product was a fibre-forming copolymer of gamma-methyl-L-glutamate and glycine.

*Example 5*

60 millimols of anhydrocarboxy-DL-valine and 60 millimols of anhydrocarboxy-α-amino-isobutyric acid were dissolved in approximately three times their total weight of nitrobenzene. 0.15 millimol of sarcosine dimethylamide in benzene solution was added as initiator and the mixture was allowed to stand for 3 days at 50° centigrade. At the end of this time polymerisation was substantially completed and evolution of carbon dioxide had substantially ceased. The polymer was precipitated by adding petroleum ether, the precipitate was filtered off, washed with petroleum ether and dried. The product was a fibre-forming copolymer of DL-valine and α-amino-isobutyric acid.

*Example 6*

120 millimols of the gamma-benzyl ester of anhydrocarboxy-L-glutamic acid were dissolved in approximately three times their total weight of nitrobenzene. 0.15 millimol of sarcosine dimethylamide in benzene solution was added as initiator and the mixture was allowed to stand for 3 days at 50° centigrade. At the end of this time polymerisation was substantially completed and evolution of carbon dioxide had substantially ceased. The polymer was precipitated by adding petroleum ether, the precipitate was filtered off, washed with petroleum ether and dried. The product was a fibre-forming polymer of gamma-benzyl-L-glutamate.

*Example 7*

The procedure described in Example 3 was repeated with the only exception that the 60 millimols of anhydrocarboxy-DL-leucine were replaced by 60 millimols of anhydrocarboxy-DL-norleucine. The product was a fibre-forming copolymer of DL-norleucine and DL-β-phenylalanine.

*Example 8*

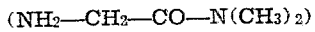

The procedure described in Example 3 was repeated with the only exception that the 60 millimols of anhydrocarboxy-DL-leucine were replaced by 60 millimols of anhydrocarboxy-DL-isoleucine. The product was a fibre-forming copolymer of DL-isoleucine and DL-β-phenylalanine.

*Example 9*

The procedure described in Example 3 was repeated with the only exception that the 60 millimols of anhydrocarboxy-DL-leucine were replaced by 60 millimols of the gamma-methyl ester of anhydro-DL glutamic acid. The product was a fibre-forming copolymer of gamma-methyl-DL-glutamate and DL-β-phenylalanine.

*Example 10*

The procedure described in Example 3 was repeated with the only exception that the 60 millimols of anhydrocarboxy-DL-leucine were replaced by 60 millimols of anhydrocarboxy-DL-valine. The product was a fibre-forming copolymer of DL-valine and DL-β-phenylalanine.

*Example 11*

The procedure described in Example 3 was repeated with the only exception that the 60 millimols of anhydrocarboxy-DL-leucine were replaced by 60 millimols of anhydrocarboxy-DL-norvaline. The product was a fibre-forming copolymer of DL-norvaline and DL-β-phenylalanine.

*Example 12*

The procedure described in Example 3 was repeated with the only exception that the 60 millimols of anyhdrocarboxy-DL-leucine were replaced by 60 millimols of anhydrocarboxy-glycine. The product was a fibre-forming copolymer of glycine and DL-β-phenylalanine.

*Example 13*

20 millimols of anhydrocarboxy-DL-β-phenylalanine were dissolved in four times their weight of nitrobenzene. 0.05 millimol of N-(aminoacetyl)-dimethylamine dissolved in nitrobenzene was added and the mixture allowed to stand for 2 days at 50° centigrade. A solution of 20 millimols of the gamma-methyl ester of anhydrocarboxy-L-glutamic acid in twice their weight of nitrobenzene was added and polymerisation was allowed to continue at 50° centigrade for a further 7 days. The copolymer was precipitated by adding petroleum ether, the precipitate was filtered off, washed with ether and with ethyl acetate and dried. The product was a fibre-forming copolymer of DL-β-phenylalanine and gamma-methyl-L-glutamate.

The products of these examples may be formed into fibres as described and claimed in application, Serial No. 159,391 of even date.

What we claim is:

1. A process for the production of polypeptides by polymerising an anhydrocarboxy-alpha-amino-carboxylic acid in the presence of an initiator having an active hydrogen atom, wherein the polymerisation is effected in nitro-benzene as a solvent for the anhydrocarboxy-alpha-amino-carboxylic acid and for the polypeptide, and the initiator is used in a proportion such that the molecular ratio of initiator to anhydrocarboxy-alpha-amino-carboxylic acid is 1 to at least 350, whereby the product obtained is fibre-forming.

2. A process for the production of polypeptides by polymerising a mixture of at least two anhydrocarboxy-alpha-amino-carboxylic acids in the presence of an initiator having an active hydrogen atom, wherein the polymerisation is effected in nitrobenzene as a solvent for the anhydrocarboxy-alpha-amino-carboxylic acids and for the polypeptide, and the initiator is used in a proportion such that the molecular ratio of initiator to anhydrocarboxy-alpha-amino-carboxylic acids is 1 to at least 350, whereby the product obtained is fibre-forming.

3. A process for the production of fibre-forming copolymers which comprises polymerising one anhydrocarboxy-alpha-amino-carboxylic acid in the presence of an initiator having an active hydrogen atom, the polymerisation being carried out in nitrobenzene as a solvent for the anhydrocarboxy-alpha-amino carboxylic acid and the polymer produced, adding a second anhydrocarboxy-alpha-amino-carboxylic acid to the polymer solution so obtained and continuing the polymerisation in nitrobenzene solution to produce a fibre-forming copolymer, the proportion of initiator used being such that the molecular ratio of initiator to total anhydrocarboxy-alpha-amino-carboxylic acid is 1 to at least 350, whereby the copolymeric product is fibre-forming.

WILLIAM EDWARD HANBY.
STEPHEN GERALD WALEY.
JAMES WATSON.

REFERENCES CITED

The following references are of record in the file of this patent:

Baldwin et al.: Journal Society of Dyers and Colorists, vol. 62, 1946, pp. 4 to 9.
Woodward et al.: Journal American Chemical Soc., vol. 69, 1947, pp. 1551 and 1552.
Ambrose et al.: Nature, vol. 163, No. 4143, March 26, 1949, pp. 483 and 484.
Sigmund et al.: Hoppe Seyler Zeitschr für Physiologische Chemie, vol. 157, 1926, pp. 91 to 96.
Frutton: Advances in Protein Chemistry, vol. V, 1949, pp. 21 to 23.